US006231985B1

(12) United States Patent
Chen et al.

(10) Patent No.: US 6,231,985 B1
(45) Date of Patent: May 15, 2001

(54) HEAT AND RADIO FREQUENCY-CURABLE TWO-PACK SOY PROTEIN-BASED POLYURETHANE ADHESIVE COMPOSITIONS

(75) Inventors: Gang-Fung Chen, Dublin; David E. Day, Columbus; David Jones, Dublin, all of OH (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 09/314,420

(22) Filed: May 18, 1999

(51) Int. Cl.$^7$ .............................. B32B 21/08; B32B 27/40
(52) U.S. Cl. ..................................... 428/425.1; 156/304.5; 156/331.7
(58) Field of Search .................. 156/304.5, 331.7; 428/425.1; 524/591, 839; 525/452, 54.1, 54.11; 527/204; 528/60, 61, 65, 66, 74.5

(56) References Cited

U.S. PATENT DOCUMENTS 3,873,478 * 3/1975 Comte et al. ..................... 527/204

* cited by examiner

Primary Examiner—D. S. Nakarani
(74) Attorney, Agent, or Firm—J. K. Mueller, Jr.

(57) ABSTRACT

An adhesive suitable for bonding wood is both heat curable and radio frequency (RF) curable. This adhesive is composed of an isocyanate-terminated prepolymer and hydrolyzed soy protein having a pH of at least about 9 and advantageously from about 9 to 11.5. The weight ratio of prepolymer to soy protein hydrolyzate ranges from about 70:30 to 90:10.

8 Claims, No Drawings

HEAT AND RADIO FREQUENCY-CURABLE TWO-PACK SOY PROTEIN-BASED POLYURETHANE ADHESIVE COMPOSITIONS

CROSS-REFERENCE TO RELATED APPLICATIONS

None

STATEMENT REGARDING FEDERALLY SPONSORED RESEARCH

Not applicable.

BACKGROUND OF THE INVENTION

The present invention generally relates to adhesives for joining wood products, and more particularly to two-part polyurethane adhesives modified with soy protein which adhesives are both heat and radio frequency (RF) curable.

Glued wood products have been traditionally used in this country in a variety of applications. The adhesives for such bonded or laminated wood products conventionally are based on phenol-formaldehyde, urea-formaldehyde, polyvinyl acetate, resorcinol-formaldehyde, polymeric diphenylmethane diisocyanate (MDI), and hot met adhesives. The glued wood products include plywood, particleboard, oriented strand board (OSB), medium density fiberboard (MDF), laminated veneer lumber (LVL), laminated beams, and a variety of other engineered wood products. Among them, laminated beams, I-beams, LVL, and a variety of engineered wood products are used for structural wood applications. Generally, these engineered wood products require an initial finger jointing of short pieces of wood or parallel laminated veneers (PLV) before they can be constructed into long and/or thick beams or lumbers. Consequently, it is important that the finger-jointed area must have good strength to be used for structural wood applications. For present purposes, all of the foregoing products are known as "laminated wood products."

At present, phenol-resorcinol-formaldehyde (PRF) is widely used in industry for finger joint applications. When adhesive is applied to the fingers, the finger jointed wood or PLV is crowded together using an end pressure until a "tip gap" of 1–40 mils is achieved. Its is essential that the fingers do not "bottom out." The finger joints then are moved into a curing zone where hot platens or dielectric plates are used to cure the finger joints under heat or radio frequency and pressure for typically less than 30 seconds and then the joints are removed away from the curing zone. The adhesives must be able to fill the gaps or voids between the fingers when curing is complete in order for the product to exhibit good strength and a smooth appearance.

One the other hand, the speed of curing must be fast under these conditions in order to hold the finger-jointed pieces together for further processing, such as beam lamination and I-joint assembly. This is especially true in a high-speed commercial finger jointing process. Generally, adhesives with high solids and fast curing profiles are regarded as appropriate for such an application.

It should be mentioned also that two-part PRF and melamine-formaldehyde (MF) adhesives generally are used in industry as adhesives in preparation of radio frequency (RF) cured finger joint assemblies. Both of these adhesives are highly polar, which makes them respond well to RF curing. RF curing drives the bondline temperature sufficiently high to permit the MF or PRF to condense quickly. Due to the rigid ring structure of both PRF and MF, these adhesives cure to give a high $T_g$, rigid, three-dimensional network in a short time; thus, producing acceptable immediate handling strength (proof-loading).

Soy protein products have been utilized as adhesives for wood bonding since the 1930's. Their use soon declined as a result of the development of petroleum derived adhesives. Economic and ecological pressures in the 1990's renewed interest in the practical use of soy protein products in wood adhesives. Heretofore, soybean protein has been proposed for use with phenolic resin, urea resin, or resorcinol resin, such as is described in JP 06200226, 58034877, 50034632, and 04057881. In JP 50034632 and 04057881, adhesives are proposed that consist of soy protein as the major component and isocyanate as a minor component because the soy protein, like wheat flour, is capable of thickening the mixture by absorbing moisture in the wood to give an adhesive with fast drying capability. In recent years, soybean-based adhesives were developed and used primarily in a "honeymoon" system, such as those described by Scheid, "Finger-Jointing and Other Uses of Environmentally Friendly Soy-Based Adhesives", *Wood Technology Clinic and Show*, Conference Proceeding, Portland, Oreg., Mar. 25–27, 1998; and Steele, et al., "Finger Jointing Green Southern Yellow Pine With A Soy-Based Adhesive", *Wood Technology Clinic and Show*, Conference Proceeding, Portland, Oreg., March 25–27, 1998.

BRIEF SUMMARY OF THE INVENTION

An adhesive suitable for bonding wood is both heat curable and radio frequency (RF) curable. This adhesive is composed of an isocyanate-terminated prepolymer and a hydrolyzed soy protein having a pH of at least about 9. The weight ratio of prepolymer to soy protein hydrolyzate ranges from about 70–90 to 30–10. Further increases in the ratio of the soy protein hydrolyzate in the mix would lead to a high viscosity, paste-like material that would not be acceptable for most, if not all, applications contemplated herein, such as, for example, gluing wood, such as, for example finger joints.

DETAILED DESCRIPTION OF THE INVENTION

It is well known that woods are porous materials that contain different moisture contents, depending upon type of wood, storage environment, etc. Moisture contents can vary from as low as 5 wt-% to greater than 30 wt-%. For adhesives to properly bond wood, it is important that the adhesive penetrates deep into the wood and interlock with the cellulose structure upon cross-linking. If the adhesive cures too fast, however, such desirable penetration is not achieved. An adhesive predominating with soy protein hydrolyzate would react and dry very rapidly, thus decreasing the ability of the adhesive to penetrate into the wood's structure to provide a strong bond.

To strike a balance, then an isocyanate-terminated prepolymer becomes the predominant component of the adhesive composition and an aqueous hydrolyzed soy protein a minor component. Such a composition would substantially decrease the rapid thickening action of the soy protein component, thus allowing the adhesive time to penetrate into the wood's structure. Water would react with the prepolymer for cure of the prepolymer in addition to the reaction between the prepolymer and the soy protein hydrolyzate component. Such a balanced cure results in strong bonds by virtue of the wood penetration of the adhesive coupled with the necessary speed of cure required in commercial settings. The examples will amply demonstrate the performance of the inventive adhesive in engineered wood applications.

Information on soy protein can be found in, for example, Kirk-Othmer, *Encyclopedia of Chemical Technology*, Third Edition, Volume 21, pp. 418–422 (1983). Soy protein hydrolyzates generally are prepared by hydrolyzing soy protein powder with an aqueous caustic solution. Treatment of soy protein with soluble caustic is necessary because the caustic breaks the internal hydrogen bonds of the coiled protein molecules and makes most of their complex polar structure available for adhesion to wood. See, for example, Bian, et al., "Adhesive Performance of Modified Soy Protein Polymers", *Polym. Prep., Am. Chem. Soc. Div., Polym. Chem.*, Volume 39 (1988), pp. 72–73. The major mechanism of protein gluing involves the dispersing and unfolding of the protein molecules in solution so that the unfolded molecules' increased surface area can contact an increased area of the wood. Additionally, the unfolded protein molecules become entangled with each other during the curing process for improving bond strength. The resulting protein hydrolyzate generally has a pH of greater than about 9 and often between about 9.5 and 12. Consequently, the hydrolyzed soy protein molecules are high in polarity, an added benefit for RF curing.

Appropriate caustics for use in hydrolyzing soy protein include, for example, the oxides, hydroxides, and the like, of alkali metals and alkaline earth metals, caustic alcohols, and the like. Representative suitable caustics include, for example, NaOH, CaO, $CH_3ONa$, $C_2H_5ONa$, $C_3H_7ONa$, and the like, and mixtures thereof. Non-caustic bases also can be used including, for example, $NH_4OH$, various amine bases, and the like. Reaction temperatures typically range from about 25° to about 120° C. with corresponding reaction times of about 1 to about 7 hours. Again, this operation is conventional and is known in the art.

Isocyanate-functional prepolymers are made from polyisocyanates reacted with a compound containing active hydrogen functionality with hydroxyl groups being typical, although mercaptan groups, amine groups, and carboxyl groups also can be used. Polyisocyanates are conventional in nature and include, for example, hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl)cyclohexane (H6XDI), dicyclohexylmethane diisocyanate ($H_{12}MDI$), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates available commercially as, for example, Mondur MR or Mondur MRS, isophorone diisocyanate (IPDI), hydrogenated methylene diphenyl isocyanate (HMDI), tetramethyl xylene diisocyanate (TMXDI), hexamethylene diisocyanate (HDI), or oligomer materials of these materials such as a trimer of IPDI, HDI or a biuret of HDI, and the like and mixtures thereof. Triisocyanates and high-functional isocyanates also are well known and can be used to advantage. Aromatic and aliphatic diisocyanates, for example, (including biuret and isocyanurate derivatives) often are available as pre-formed commercial packages and can be used to advantage in the present invention.

Preferred polyols for reacting with the polyisocyanates include, for example, polyether polyols (e.g., block polyethylene and polypropylene oxide homo- and copolymers ranging in molecular weight from about 300 to about 3,000) optionally alkylated (e.g., polytetramethylene ether glycols), caprolactone-based polyols, and the like. However, the component also may be formulated with mixtures of aliphatic and aromatic polyols, or a multi-functional, active hydrogen-bearing polymer. Thus, in addition to polyether polyols, the hydroxyl-functional component may include derivatives of acrylates, esters, vinyls, castor oils, as well as polymers and mixtures thereof.

Isocyanate equivalents should predominate over active hydrogen equivalents in the polyisocyanate/polyol reaction mixture in order for the resulting prepolymer to contain residual isocyanate groups. Reaction conditions for this reaction are well known in the art, such as described by Heiss, et al., "Influence of Acids and Bases on Preparation of Urethane Polymers", *Industrial and Engineering Chemistry*, Vol. 51, No. 8, August 1959, pp. 929–934. Depending upon the reaction conditions used (such as, for example, temperature and the presence of strong acids or bases, and catalysts), the reaction may lead to the formation of ureas, allophanates, biurets, or isocyanates.

The isocyanate prepolymer must be separated from the aqueous hydrolyzed soy protein in order to preclude premature gellation and crosslinking. This is because the isocyanate group from the prepolymer can react with either water in the soy protein hydrolyzate solution or with any amine or any carboxyl group in the hydrolyzed soy protein molecules at a relatively fast rate of reaction, particularly under the influence of catalysis using dibutyl tin dilaurate catalyst (T-12 brand, see Examples) and base (in the soy protein hydrolyzate). Thus, the inventive wood glue is a two-pack or two-part composition whose packs or parts are mixed together just prior to application to the wood.

Application of the inventive glue is conventional for this art. Cure of the glue can be by simple heating as taught in this art and practiced commercially at, say, from about room temperature to about 175° C. for times ranging from as short as say, 30 seconds, on up to about 2 minutes, with cure times dependent upon reaction temperature and catalyst concentration.

Alternatively, radio frequency or dielectric heating can cure the inventive wood glue. The principal of dielectric heating is defined as the rapid movement of the radio waves through a material that causes molecular friction to take place and subsequently produce heat. Instead of current flow, the forces used in dielectric heating are caused by charges on the plates placed on opposite sides of the material to be heated—one plate being positive and one plate being negative. These oppositely charged plates set up forces of attraction between themselves. The forces in the electric field can influence the movement of the adhesive molecules, because these molecules are not electrically symmetrical, but have dipole moment, i.e., the measure of electrical asymmetry of a molecule. Since oppositely charged particles are attracted to each other, the molecules in the adhesive line up with the negative poles towards the positive plate (or electrode) and the positive poles towards the negative plate. As the charges on the plates reverse, the dipole molecules in the adhesive rotate to keep the same alignment just described. This rotation of the molecules produces friction that generates heat that is required for cure of the adhesive composition. The amount of heat actually developed by the adhesive composition in the RF field depends upon factors including, for example, the amount of moisture in the composition, the strength (voltage) of the electric field, the frequency of the radio waves, and the length of time that the composition spends in the field.

Two important properties determine how much heat the adhesive material will develop in an alternating electric field: the dielectric constant and the power factor. The dielectric constant of a material is a measure of the ability of the dipole molecules in such material to rotate when subjected to an electric field. The power factor of a material is a measure of the ability of such material to convert the energy in the electric field into heat energy. The dielectric constant is determined by the strength of the permanent charge on the dipole molecules. Strong permanent dipole charges increase the molecular movement. The linkage that exists between the molecules of the material determines the power factor. These linkages hold the molecules closely together and their resistance to movement results in friction when the molecules move and, thus, heat is generated.

Another factor that may contribute to heat in dielectric heating is the ionic conductivity, given that some adhesives also contain ions. Some ions in the adhesive composition are positively charged, while others are negatively charged. When an adhesive composition is placed in an alternating electric field set up between two positively charged plates, the negatively charged ions try to move toward the positive pole while the positively charged ions try to move toward the negative plate. Since the charge on the plates is rapidly reversing in dielectric heating, there is considerable back and forth movement of the ions which rapid change in direction and movement results in frictional heating also.

Thus, for RF curability of the inventive adhesive or glue, it is important that the adhesive have sufficient polarity to respond to the dielectric or RF heating when it is placed in a dielectric heating unit. Since the immediate handling strength in the RF cured finger joint is an important consideration, it is necessary that the adhesive should provide a fast curing rate as well as a sufficiently high $T_g$ that the adhesive will solidify rapidly in a short amount of time. While proper selection of a catalyst may achieve the purpose of providing the necessary rate of reaction for providing proof-loading (immediate handling strength), they also contribute negative attributes to the adhesive, such as decreased open times, shelf stability, and the like. On the other hand, it is also important that the adhesive should possess a good water resistance, such as the requirements specified in the ASTM D-5751 non-structural laminate performance test and most specifically, the ASTM D-2559 structural laminate wet performance test. In this sense, the role of the soy protein hydrolyzate (the minor component) is to contribute to the RF curability, and the role of the prepolymer (the major component) is to provide the adhesive with integrity for structural applications.

On the other hand, the soy protein hydrolyzate generally is prepared by hydrolyzing soy protein powder with aqueous caustic, as described above. Thus, the hydrolyzate typically has pH of above 9. Consequently, such hydrolyzate is high in polar molecules which positively aids in RF curing and may even contain a small amount of electrically conductive material. This makes the soy protein hydrolyzate an ideal component for inclusion in the adhesive composition of the present invention.

An important part of this invention is centered on the preparation of a soy protein hydrolyzate that will provide a glue mix (with the prepolymer) having an acceptable consistency and pot-life, because the prepolymer and soy protein hydrolyzate are incompatible and difficult to mix together due to the large difference of polarity between them. If a sufficiently high shear rate is applied to force these two components together, the resulting mix viscosity is too high to be acceptable for practical (and commercial) application of the glue mix. Furthermore, the presence of caustic in the soy protein hydrolyzate also catalyzes the crosslinking reaction of the prepolymer and the soy protein hydrolyzate mix almost immediately, resulting in a mixed adhesive having an unacceptably short pot-life. Again, such an adhesive composition is not acceptable for commercial purposes.

Consequently, an appropriate inhibitor (such as, for example, benzoyl chloride or monophenyldichlorophosphate) is added to the prepolymer to retard the crosslinking reaction of the mixed adhesive system. The glue mix consistency also is improved and the pot-life is increased to an acceptable range (e.g., say, 12–20 minutes) by incorporating a nonionic wetting agent (e.g., Dynol™ 604 surfactant) in the soy protein hydrolyzate. On the other hand, there is a fine balancing point between the glue mix pot-life and the immediate handling strength (proof-loading) after RF cure. Too long of a glue mix pot-life (say, greater than 20 minutes) usually results in undesirable proof-loading following RF cure because the rate of reaction has been decreased too much. Addition of these adjuvant components and others to adhesive compositions, however, is well known and well practiced commercially, and such adjuvant components may be used in the inventive adhesive in conventional and unconventional fashion as those skilled in this art will appreciate.

Finally, it should be noted that RF curing is self-limiting in terms of heat generation. As the molecules in the composition cross-link or react, the amount of free polar molecules decreases. With less polar molecules to rapidly "vibrate" under the influence of RF, less heat is generated. Thus, over-heating generally is not a problem.

Equipment for RF curing is commercially available and well known in the art. Reference is made to the undated booklet entitled *Radio Frequency Heating,* by Franklin International (Columbus, Ohio) for a good review of the fundamentals of RF heating and equipment used therein.

The following examples show how the present invention has been practiced but should not be construed as limiting the invention. In this application, all units are in the metric system unless otherwise noted. Also, all citations are expressly incorporated herein by reference.

EXAMPLES

Example I

A 22-liter, three-neck round bottom reaction flask was charged with 6,987 g of a polyether diol (MW of 2,000, average OH number of 56, viscosity @ 25° C. of 215 cps, density of 8.33 lbs/gal, Ashland Chemical Co. code 033-192), 11,744 g of polymeric methylene diisocyanate or MDI (Mondur MRS poly(methylenephenylene) polyisocyanate, average functionality of 2.8, average equivalent weight of 133, NCO content of 31.6%, viscosity @ 25° C. of 250 cps, Miles Chemical) and 18.7 g of D-1400 defoamer (polydimethylsiloxane and treated amorphous silica foam control agent, Dow Corning Corporation, Midland, Mich.). These ingredients were mechanically agitated at room temperature (viz., 24.8° C.) under a nitrogen blanket to form a mixture. 19.86 g of dibutyl tin dilaurate catalyst (DABCO® T-12 catalyst, 18.0% total tin, Air Products and Chemicals, Inc., Allentown, Pa.) was added to the mixture and a mild exotherm was observed to push the temperature to about 42° C. in 30 minutes. A second portion of T-12 catalyst, 17.64 g, was added to the reaction flask and the reaction was continued for another 30 minutes. Finally, 140.6 g of benzoyl chloride was added to the reaction flask and mechanical agitation was continued to an additional 15 minutes to produce an isocyanate prepolymer. This product was labeled as EP 5815-106-3 or 5815-140.

either 330° F. or 350° F., and used to bond parallel laminated veneer (PLV) finger joints. The following force and percent wood failure (WF) results were recorded:

TABLE 1

| | PRF (350° F.) | | EP 5815-106-3 (350° F.) | | | | EP 5815-106-3 (330° F.) | | | |
|---|---|---|---|---|---|---|---|---|---|---|
| | 6 HOURS | | 30 MINUTES | | 24 HOURS | | 1 HOUR | | 24 HOURS | |
| Run | Force (lbs) | % WF | Force (lbs) | % WF | Force (lbs) | % WF | Force (lbs) | % WF | Force (lbs) | % WF |
| 1 | 9090 | 95 | 9310 | 95 | 12160 | 100 | 10110 | 100 | 11860 | 100 |
| 2 | 9900 | 90 | 11310 | 95 | 12270 | 100 | 8370 | 100 | 8470 | 100 |
| 3 | 8280 | 90 | 10230 | 100 | 11330 | 100 | 9590 | 100 | 0790 | 99 |
| 4 | 8280 | 90 | 12380 | 100 | 11050 | 100 | 8850 | 100 | 10710 | 100 |
| 5 | 7560 | 85 | 10960 | 100 | 12240 | 100 | 9240 | 100 | 9830 | 100 |
| 6 | 9310 | 90 | 11110 | 100 | 11780 | 100 | 9130 | 95 | 8980 | 100 |
| 7 | 7449 | 95 | 10210 | 95 | 13090 | 100 | 8650 | 100 | 9500 | 99 |
| 8 | 7610 | 95 | 11610 | 100 | 14190 | 100 | 9340 | 100 | 9570 | 100 |
| 9 | 6240 | 95 | 11000 | 95 | 10740 | 100 | 9070 | 100 | 11070 | 100 |
| 10 | 8990 | 90 | 9010 | 95 | 10930 | 100 | 10200 | 100 | 10760 | 100 |
| 11 | 10990 | 100 | 9970 | 95 | 11610 | 100 | 10520 | 100 | 9780 | 100 |
| 12 | 9170 | 95 | 11770 | 95 | 10020 | 100 | 9250 | 100 | 10330 | 100 |
| 13 | 10790 | 85 | 11840 | 95 | 12640 | 100 | 11750 | 100 | 9880 | 99 |
| 14 | 11320 | 95 | 9980 | 95 | 11280 | 100 | 10440 | 100 | 12710 | 100 |
| 15 | 9940 | 100 | 10850 | 95 | 12140 | 100 | 11350 | 100 | 9840 | 100 |
| 16 | 9710 | 85 | 10850 | 95 | 11230 | 100 | 10520 | 100 | 10050 | 100 |
| 17 | 9720 | 90 | 9350 | 100 | 9400 | 100 | 8720 | 100 | 9960 | 100 |
| 18 | 8350 | 85 | 11240 | 95 | 9540 | 99 | 8760 | 100 | 7980 | 100 |
| 19 | 10230 | 90 | 8540 | 100 | 12290 | 100 | 9620 | 100 | 10670 | 100 |
| 20 | 10190 | 85 | 11990 | 100 | 11420 | 99 | 9510 | 100 | 12090 | 100 |
| 21 | 9330 | 95 | 10020 | 95 | 10720 | 100 | 10620 | 100 | 11870 | 99 |
| 22 | 8220 | 95 | 9350 | 95 | 11200 | 100 | 11190 | 100 | 12880 | 100 |
| 23 | 7090 | 90 | 10070 | 100 | 10160 | 99 | 9080 | 100 | 10820 | 100 |
| 24 | 8530 | 95 | 9980 | 100 | 11000 | 100 | 10490 | 100 | 10610 | 100 |
| 25 | 10620 | 95 | 11350 | 100 | 11750 | 100 | 8010 | 100 | 11430 | 100 |
| 26 | 9940 | 90 | 11540 | 100 | 11010 | 100 | 9580 | 100 | 10620 | 100 |
| 27 | 10030 | 90 | 10500 | 100 | 11440 | 100 | 8050 | 100 | 10170 | 100 |
| 28 | 10000 | 95 | 12170 | 100 | 11220 | 100 | 11000 | 100 | 12620 | 100 |
| 29 | 10400 | 90 | 10550 | 95 | 10360 | 100 | 11230 | 95 | 10950 | 100 |
| 30 | 11850 | 90 | 10660 | 95 | 10360 | 100 | 11230 | 95 | 10950 | 100 |
| 31 | | | 10150 | 100 | 11070 | 100 | 1078- | 100 | 12780 | 99 |
| 32 | | | 9250 | 100 | 11760 | 100 | 11820 | 95 | | |
| AVG | 9311 | 92 | 10597 | 98 | 11350 | 100 | 9952 | 100 | 10587 | 100 |
| Std. Dev. | (1325) | (4) | (987) | (3) | (1004) | (1) | (1252) | (1) | (1264) | (1) |
| # of 100% WF | 2 | | 17 | | 28 | | 29 | | 25 | |

Example II

The isocyanate prepolymer made in Example I was mixed with a soy protein hydrolyzate (HTI ProBond 3050, 36–38% solids, pH of 9.5-11.0, viscosity of 400–2000 cps, Hopton Technologies, Inc., Albany, Oreg.) at varying ratios. Generally, the speed of the resulting reaction was based on such ratio (isocyanate prepolymer:soy protein hydrolyzate). When the ratio of isocyanate prepolymer to soy protein hydrolyzate was e.g., 9:1), an open time (time to cure) of greater than 10 minutes was observed. If this same ratio was much lower (e.g., 3:2) the mixture cured to a granular solid within 2 minutes. At a ratio of 4:1, an open time of 3–6 minutes was observed to give an excellent finger joint performance.

Example III

The two-part adhesive composition disclosed in Example II (EP 5815-106-3) was compounded at a 4:1 ratio, cured at These results demonstrate that the inventive adhesive not only provides excellent finger joint application for PLV boards, but also outperformed the industrial standard PRF composition.

Example IV

The two-part adhesive composition disclosed in Example II (5815-140) was cured at 330° F. for 30 seconds in a strength development study to join Douglas fir finger joints with high moisture content (16%–22%). PRF adhesive was used as a comparison adhesive. The results recorded are set forth below.

TABLE 2*

| TIME (min) | EP 5815 140/HTI 3050 (psi) | PRF (psi) |
|---|---|---|
| 5 | 4531 ± 675 | 3006 ± 957 |
| 10 | 5458 ± 1152 | 1782 ± 80 |

TABLE 2*-continued

| TIME (min) | EP 5815 140/HTI 3050 (psi) | PRF (psi) |
|---|---|---|
| 30 | 6018 ± 2969 | 4564 ± 1458 |
| 60 | 7408 ± 1790 | 3152 ± 1890 |

*Each data point is the average of 4 specimens.

These results demonstrate that the inventive adhesive provided faster and stronger finger joint strength on high moisture content Douglas fir wood than the industrial standard PRF.

Example V

Several formulations based on the commercial soy protein hydrolyzate, HTI 3050, and prepolymers containing different levels of the T-12 brand tin catalyst concentrations were compared in an engineered wood application using Douglas fir (specific gravity of 0.47–0.50) test procedure followed was ASTM D-5751. The following results (PSI is pounds per square inch; WF is wood failure) were recorded.

TABLE 3

| T-12 Catalyst Concentration | 0* | 0.05* | 0.2** |
|---|---|---|---|
| Closed Assembly Time (min) | 8 | 6 | 4 |
| Dry | | | |
| PSI | 1963 | 1320 | 1505 |
| WF (%) | 95 | 85 | 95 |
| Vacuum-Pressure | | | |
| PSI (Standard Deviation) | 949 (101) | 975 (94) | 793 (127) |
| WF (%) (Standard Deviation) | 52 (17) | 56 (13) | 46 (24) |
| Two-Cycle Boil | | | |
| PSI (Standard Deviation) | 802 (113) | 705 (87) | 765 (56) |
| WF (%) (Standard Deviation) | 79 (13) | 85 (12) | 69 (21) |

*Same formulation as in Example I, except in the T-12 concentration and the high reaction temperature (75 ± 5° C. for 3 hours).
**Same as in Example I.

These results demonstrate that the inventive adhesive formulations based on soy protein hydrolyzates are suitable for non-structural applications.

Example VI

Two additional isocyanate prepolymers were made according to the procedure set forth in Example I, except that an inhibitor was added after the NCO determination (ACC method Ac-21a-79) revealed that the desired extent of reaction had been achieved.

TABLE 4

| INGREDIENT* (g) | 6204-144 | 6298-46A** |
|---|---|---|
| Polyetherdiol (MW of 2,000, see Example I) | 332.1 | 0 |
| Polyether diol (MW of 1,000) | 0 | 448 |
| Mondur MRS polyisocyanate (see Example I) | 1116.9 | 1104 |
| Rubinate 9310 polyisocyanate | 0 | 260.2 |
| D-1400 antifoam agent (see Example I) | 1.62 | 2.24 |
| Dibutyl tin dilaurate (T-12 brand, see Example I) | 3.42 | 3.63 |

TABLE 4-continued

| INGREDIENT* (g) | 6204-144 | 6298-46A** |
|---|---|---|
| Monophenyldichlorophosphate (inhibitor) | 4.05 | 4.54 |

*Polyether diol (MW of 1000, OH number of 112, viscosity @ 25° C. of 322 cps, density of 8.34 lbs/gal, Ashland Chemical Code 033-191). Rubinate 9310 polyisocyanate (% NCO = 29.3%, viscosity @ 25° C. = 35 cps, average functionality = 2.1, ICI Polyurethanes).
**Same prepolymeras 6298-84B, 100A, 121C, 145C, and 167.

It should be noted that the flexibility of the prepolymers can be ranked in the order of 5815-140>6204-144>6204-46A. It will subsequently be detailed that, while the increased rigidity of the prepolymer structure might help the immediate strength after RF curing, such prepolymer will not have the necessary acceptable accelerated aging resistance to water (wet cycles under vacuum, pressure, or steam) to meet the standards for structural (exterior) engineered wood applications.

Example VII

Several soy protein hydrolyzates were prepared at ambient temperature according to the formulations set forth below.

TABLE 5

| INGREDIENT (g) | 6289-009A | 6289-009B | 6289-010B | 6298-19B |
|---|---|---|---|---|
| Deionized water | 87.5 | 87.5 | 87.5 | 87.5 |
| Pro-Cote 200 polymer* | 48.5 | 48.5 | 48.5 | 48.5 |
| Soybean oil | 1.5 | 1.5 | 1.5 | 1.5 |
| Deionized water | 72.5 | 72.5 | 72.5 | 72.5 |
| Hydrated lime (fresh)** | 6.0 | 6.0 | 6.0 | 6.0 |
| Deionized water | 12.0 | 12.0 | 12.0 | 12.0 |
| 50 wt-% sodium hydroxide | 6.0 | 6.0 | 6.0 | 6.0 |
| 2-Phenyl phenol | 2.5 | 2.5 | 2.5 | 2.5 |
| Sodium silicate solution*** | 4.0 | 5.0 | 4.5 | 5.0 |

*Pro-Cote 200 natural polymer extract from soybeans (light tan granular powder, pH of 4.6 in a water slurry, less than 2% retained on 30 mesh screen, Protein Technologies International, St. Louis, MO).
**prepared by mixing 6.6 g of anhydrous calcium oxide with 10 g of deionized water.
***$SiO_2/Na_2O$ weight ratio of 2.4 (Occidental Chemical Corp.)

A typical procedure can be found is Pizzi, *Wood Adhesive-Chemistry and Technology,* Vol. 2, pp. 1–29 (1989) and involves mixing and dispersing soy protein powder (Pro-Cote®200) and soybean oil in water at ambient temperature for about 3 minutes. After the soy protein powder was thoroughly dispersed, more water was added and mixing continued for another 2 minutes. Hydrated lime then was added and mixing continued for another 5 minutes, followed by the addition of NaOH (50 wt-%). This reaction was permitted to continue for about 30 minutes. The addition of 2-phenyl phenol and sodium silicate solution was made to provide mold resistance in high humidity environments and to gain better viscosity stability control.

Example VIII

Another technique was developed to prepare soy protein hydrolyzates at 60° C. using the formulations set forth below.

TABLE 6

FORMULATIONS 6204- (g)

| INGREDIENT | 112A | 112B | 112C | 121 | 122A | 122B |
|---|---|---|---|---|---|---|
| Water | 688 | 658 | 688 | 592 | 685 | 688 |
| Soy Protein Powder (Pro-Cote 200) | 194 | 194 | 194 | 174.6 | 0 | 0 |
| Soy Protein Powder (Pro-Cote PX-270)* | 0 | 0 | 0 | 0 | 194 | 194 |
| 2-Phenyl phenol | 10 | 10 | 10 | 9 | 10 | 10 |
| Antifoam (Dow Corning 1400 agent) | 0.4 | 0.4 | 0.4 | 0.4 | 0.4 | 0.4 |
| $NH_4OH$ (37 wt-%) | 24.1 | 24.1 | 24.1 | 0 | 0 | 0 |
| NaOH (50 wt-%) | 0 | 12.1 | 30.1 | 19.2 | 15.5 | 15.5 |
| CaO (98% purity) | 0 | 0 | 0 | 7.1 | 12.5 | 18.8 |
| Water (to adjust viscosity) | 124 | 124 | 124 | 27 | 62.5 | 62.5 |
| Sodium silicate solution ($SiO_2/Na_2O$ ratio of 2.4) | 0 | 0 | 0 | 37 | 0 | 0 |

*Pro-Cote PX-270 is a modified polymer derived from soybeans (fine light tan powder less than 2% retained on 30 mesh screen, pH of 4.7 in water slurry, Protein Technologies International, St. Louis, MO).

TABLE 7

FORMULATIONS 6298- (g)

| INGREDIENT | 139B | 139C | 142B | 156B | 162B |
|---|---|---|---|---|---|
| Water | 324 | 324 | 482 | 500 | 366 |
| Soy Protein Powder (Pro-Cote 200) | 97 | 97 | 97 | 97 | 97 |
| 2-Phenyl phenol | 5 | 5 | 5 | 5 | 5 |
| NaOH (50 wt-%) | 10.67 | 10.67 | 3.2 | 3.2 | 10.67 |
| CaO (98% purity) | 3.95 | 3.95 | 0.79 | 0.79 | 3.95 |
| HCl (4.63 wt-%) | 94.46 | 122 | 0 | 0 | 94.46 |
| NaCl | 0 | 0 | 6.66 | 6.22 | 0 |
| Dynol™ 604 surfactant | 0 | 0 | 0 | 1.02 | 1.59 |
| Sodium silicate solution ($SiO_2/Na_2O$ ratio of 2.4) | 20.4 | 19.55 | 19.55 | 19.55 | 20.4 |

Water and 2-phenyl phenol were charged into a round-bottomed reactor and heated to 60°±2° C. with mechanical agitation. When the temperature reached 60°±2° C., soy protein powder was added to the reaction with stirring continued for 2–5 minutes until a homogeneous dispersion was achieved. A 50 wt-% aqueous NaOH solution and/or $NH_4OH$ and/or CaO and/or sodium silicate and/or HCl and/or NaCl and/or water and/or Dynol™ 604 solution then was/were slowly added into the reaction to adjust the final pH and viscosity.

Example IX

Two-part polyurethane adhesives were made from the isocyanate prepolymers of Example I and the soybean hydrolyzates of Examples VII (Tables 5) at a ratio weight of 4:1 in order to obtain a homogeneous glue mixture. The glue mixture along with a commercial melamine formaldehyde adhesive was applied to Douglas fir finger joint specimens (1.5"×1.5"×6"). The joints then were crowded together by a hammer until a "tip gap" of 1–40 mils was achieved prior to curing by RF. Following RF curing, the surface temperature of the joints was measured and the adhesives were ranked visually within 20 seconds of RF treatment as: wet, tacky, or dry. Following RF curing, the bondline temperature of the joints also was measured and the finger joint strength was determined by clamping the finger joints into a vise and hitting them with a hammer within 30 seconds. A subjective ranking was assigned depending on the relative resistance of the finger joint to breaking under the impact of the hammer swing as: poor, fair, good, or excellent.

Curing of the finger joints was accomplished using low, 5 MHz RF (4,200 v, 30 seconds) curing. The results recorded are set forth below.

TABLE 8

| L Adhesive | Bondline Temp. (° F.) | Hammer Strength |
|---|---|---|
| Prepolymer of Example I/6298-19B hydrolyzate of Example VII, Table 5 (4/1 weight ratio) | 140 | Excellent |
| Cascomel® MF 216S melamine formaldehyde adhesive (Borden Chemicals, Columbus OH) | 177 | Excellent |

These results demonstrate that at the correct bondline temperature, the inventive adhesive formulation provided excellent adhesive performance. Such performance matched that of a conventional commercial melamine formaldehyde adhesive.

Example X

Adhesive formulations like those described in Example IX were prepared using different soy protein hydrolyzates (see Example VIII, Table 6) having varying pH levels and the isocyanate prepolymer 6298-84B (see Example VI, Table 4). The finger joints were cured at 30 MHz (3,500 v, 10 seconds). Following RF curing, the surface temperature of the joints was measured and the adhesives ranked visually within 20 seconds of RF treatment as: wet, tacky, or dry. Bond strength was determined by clamping the finger joints into a vise and hitting them with a hammer at 30 seconds. A subjective ranking was assigned depending on the resistance of the finger joint to breaking under the impact of the hammer swing as: poor, fair, good, or excellent. The results recorded are set forth below.

TABLE 9

| Soy Protein Hydrolyzate* | pH | Surface Temp After RF (° F.) | Appearance After RF | Bond After RF |
|---|---|---|---|---|
| 6204-112A | 9.5 | 128 | Tacky | Good |
| 6204-112B | 10.2 | 130 | Tacky | Fair |
| 6204-112C | 11.9 | 135 | Dry | Good |

*See Example VIII, Table 6.

These results demonstrate that as the pH of the soy protein hydrolyzates increase, the degree of RF curing increases based on measured surface temperature, ranked appearance, and bond performance. This data also would suggest that as pH increases, the polarity of the mixed adhesive increases, which leads to a better RF cure.

Example XI

Tests like those described in Example X were conducted on prepolymer 6298-121C (Example VI, Table 4) and the soy protein hydrolyzate of Example VIII, Table 7. The results recorded are set forth below.

TABLE 10

| Soy Protein Hydrolyzate | pH | Time of Test Post RF (sec) | Appearance | Surface Temp. (° F.) | Hammer Strength | Amp. Draw* |
|---|---|---|---|---|---|---|
| 6204-133B | 10.8 | 15 | Dry | 133 | Good | 0.65 |
| | | 20 | Dry | 126 | Excellent | 0.75 |
| | | 20 | Dry | 147 | Excellent | 0.65 |
| | | 30 | Dry | 145 | Excellent | 0.70 |
| | | 30 | Dry | 144 | Good | 0.60 |
| | | 40 | Dry | 145 | Excellent | 0.75 |
| | | 40 | Dry | 144 | Excellent | 0.60 |
| 6204-135 | 9.5 | 20 | Tacky | 130 | Good | 0.70 |
| | | 20 | Tacky | 150 | Poor | 0.65 |
| | | 30 | Tacky | 162 | Fair | 0.70 |
| | | 30 | Tacky | 142 | Fair | 0.60 |
| | | 40 | Dry | 140 | Excellent | 0.75 |
| | | 40 | Dry | 145 | Excellent | 0.70 |
| 6204-137 | 10.7 | 15 | Dry | 153 | Good | 0.70 |
| | | 20 | Dry | 145 | Excellent | 0.75 |
| | | 20 | Dry | 145 | Excellent | 0.75 |
| | | 30 | Dry | 160 | Excellent | 0.85 |
| | | 30 | Dry | 145 | Excellent | 0.70 |
| | | 40 | Dry | 172 | Excellent | 0.70 |
| | | 40 | Dry | 150 | Excellent | 0.70 |
| 6204-139 | 10.2 | 20 | Tacky | 156 | Poor | 0.65 |
| | | 20 | Tacky | 145 | Fair | 0.65 |
| | | 30 | Dry | 148 | Good | 0.75 |
| | | 30 | Dry | 150 | Excellent | 0.70 |
| | | 40 | Dry | 149 | Excellent | 0.70 |
| | | 40 | Dry | 160 | Excellent | 0.68 |

*Amp Draw is the peak amperage draw during RF curing

These results demonstrate that all of the polyurethane-soy protein hydrolyzate adhesives cured well by RF, based on the draw of current during RF treatment, the measured surface temperatures, and the appearances after RF curing. Most importantly, these formulations provided excellent hammer strength when tested at 15, 20, 30, and 40 seconds after RF cure. Such results are indicative that the RF cured finger joints would have an acceptable immediate handling strength also. Among the formulations tested, soy protein hydrolyzate 6204-137 was judged the best.

Example XII

While RF curability is an important consideration in the development of two-part polyurethane-soy protein hydrolyzate adhesives, the ultimate strength of the finger joint is an equally important consideration. Thus, finger joint specimens were prepared by first cutting each paired specimen member into 1.5"×1.5"×6" segments to be cured by RF (30 MHz, 3500 v, 10 seconds). After the curing of the mated finger joints, each specimen then was cut into 1"×3/8×11" specimens to be tested at specific times post RF cure. The results displayed below are based on prepolymer 6298-100A (see Example VI, Table 4) mix with soy protein hydrolyzates at a 4:1 ratio.

TABLE 11

| | One Day (Average of 5 Specimens) | | 4 Days (Average of 10 Specimens) | |
|---|---|---|---|---|
| Soy Protein Hydrolyzate* | Strength (psi) | WF % | Strength (psi) | WF % |
| 6204-121 | 5312 ±, 1816 | 88 ± 12 | 5744 ± 1137 | 92 ± 6 |
| 6204-122A | 6348 ± 2202 | 84 ± 15 | 7226 ± 2082 | 81 ± 21 |

TABLE 11-continued

| | One Day (Average of 5 Specimens) | | 4 Days (Average of 10 Specimens) | |
|---|---|---|---|---|
| Soy Protein Hydrolyzate* | Strength (psi) | WF % | Strength (psi) | WF % |
| 6204-122B | 6755 ± 1429 | 82 ± 19 | 7284 ± 806 | 81 ± 19 |

*For hydrolyzates, see Example VIII, Table 6.

TABLE 12*

| Soy Protein Hydrolyzates* | 6298-139C | 6298-142B |
|---|---|---|
| Appearance | Dry | Dry |
| Peak Amperage Draw | 0.75 | 0.73 |
| Hammer Strength | Excellent | Excellent |
| Ultimate Strength (psi)** | 6959 ± 1387 | 5321 ± 1288 |
| % Wood Failure | 47 ± 25 | 42 ± 34 |

*For Hydrolyzes, see Example VIII, Table 7; and for prepolymer, see 6298-145C in Example VI, Table 4. Prepolymer:Soy Protein Hydrolyzate of 4:1.
**Ultimate Strength is an average of 9 specimens RF cured, and then aged at ambient temperature for 6 days.

These results demonstrate that the two-part polyurethane-soy protein hydrolyzate adhesives possess good ultimate finger strength when cured by RF.

Example XIII

Additional RF curing was conducted using the three prepolymers described in Examples I and VI, and with the soy protein hydrolyzates described in Example VIII, Table 7. Bond strength (hammer strength) was tested 30 seconds after RF cure.

TABLE 13

| Prepolymer (mix ratio with soy protein hydrolyzate) | Ranked Pot-Life (min) | Time of Test Post RF Cure (min) | Appearance | Surface Temp. (° F.) | Hammer Strength | Amp. Draw (Peak-End) |
|---|---|---|---|---|---|---|
| 6298-156B SOY PROTEIN HYDROLYZATE | | | | | | |
| 6298-167 (80/20) | 22 | 30 | Dry | 138 | Good | 0.60–0.50 |
| 6298-167 (75/25) | 13 | 30 | Dry | 151 | Excellent | 0.75–0.55 |
| 6204-144 (80/20) | 16.5 | 30 | Dry | 140 | Excellent | 0.65–0.50 |
| 8364A37174 (80/20)* | 9.5 | 20 | Dry | 149 | Excellent | 0.70–0.55 |
| 8364A37174 (80/20) | 9.5 | 30 | Dry | 140 | Excellent | 0.65–0.50 |
| 8364A37174 (75/25) | 8.5 | 30 | Tacky | 151 | Poor | 0.80–0.60 |
| 6298-162B SOY PROTEIN HYDROLYZATE | | | | | | |
| 6298-167 (80/20) | 9.5 | 30 | Dry | 142 | Excellent | 0.60–0.50 |
| 6204-144 (80/20) | 8 | 30 | Dry | 156 | Excellent | 0.70–0.55 |
| 8364A37174 (80/20) | 7.5 | 30 | Dry | 150 | Excellent | 0.70–0.60 |
| 8364A37174 (75125) | 3.5 | 30 | Dry | 143 | Excellent | 1.05–0.55 |

*8364A37174 prepolymer is the same as 5815-140 of Example I.

TABLE 14

| Prepolymer (mix ratio with soy Protein hydrolyzate) | Ranked Pot-Life (min) | Time of Test Post RF Cure (min) | Appearance | Surface Temp. (° F.) | Hammer Strength | Amp. Draw (Peak-End) |
|---|---|---|---|---|---|---|
| 6298-162B SOY PROTEIN HYDROLYZATE | | | | | | |
| 6298-167M (80/20)* | 24 | 30 | Tacky | 148 | Fair | 0.65–0.55 |
| 6298-167M (80/20) | 24 | 45 | Tacky | 150 | Fair | 0.75–0.60 |
| 6298-167M (80/20) | 24 | 60 | Tacky | 158 | Good | 0.70–0.55 |
| 6204-167M (80/20) | 17 | 30 | Tacky | 123 | Poor | 0.65–0.55 |
| 6204-167M (80/20) | 17 | 45 | Tacky | 138 | Poor | 0.65–0.55 |
| 8364A37174M (80/20) | 18.5 | 30 | Tacky | 148 | Excellent | 0.65–0.55 |
| 8364A37174M (80/20) | 18.5 | 45 | Tacky | 141 | Poor | 0.70–0.55 |
| 6298-167M (75/25) | 4 | 30 | Dry | 144 | Excellent | 1.15–0.55 |
| 6204-144M (75125) | 5 | 30 | Dry | 130 | Excellent | 1.20–0.60 |

*The "M" series of prepolymers contained an additional 0.25% of monophenyldichlorophosphate.

These results indicate that as the prepolymer and soy protein hydrolyzate mix ratio decreased from 4:1 to 3:1, the cured adhesive appeared dry, together with excellent hammer strength. However, the pot-life became short. On the other hand, if an additional 0.25% inhibitor (monophenyldichlorophosphate) is added to the prepolymer, the ranked pot-life increased. This substantially retarded the RF curing which led to a tacky appearance and decreased bond strength.

Example XIV

Finger joint ultimate strength also was obtained using the three prepolymers described in Example I and VI, and the soy protein hydrolyzates described in Example VIII, Table 7. The finger joint specimens were cured by RF (30 MHz, 3500 v, 10 seconds). After standing at ambient temperature for 7 days, these specimens were cut into 1"×⅜"×11" specimens to be tested for tensile strength. The results recorded are displayed below:

TABLE 15

| | Wood Strength, psi (Wood Failure, %) | | | | | |
|---|---|---|---|---|---|---|
| Sample No. | 6298-167/ 6298-156B (4/1) | 6298-167/ 6298-156B (3/1) | 6204-144/ 6298-156B (4/1) | *8364A37174/ 6298-156B (4/1) | 6204-144/ 6298-162B (4/1) | 8364A37174/ 6298-156B (4/1) |
| 1 | 4651 (20) | 7947 (45) | 5616 (99) | 5029 (99) | 9973 (98) | 6517 (99) |
| 2 | 5288 (70) | 8779 (30) | 6331 (99) | 5571 (99) | 8016 (90) | 7821 (99) |
| 3 | 4192 (20) | 5165 (40) | 7707 (99) | 6291 (98) | 9328 (95) | 5656 (99) |
| 4 | 5632 (80) | 7253 (90) | 7152 (30) | 5398 (100) | 8237 (40) | 3584 (100) |
| 5 | 5072 (900) | 8987 (90) | 7376 (30) | 5656 (100) | 8509 (45) | 3680 (100) |
| 6 | 7555 (85) | 8165 (100) | 8445 (40) | 6616 (99) | 7971 (100) | 2904 (100) |
| 7 | 6539 (40) | 3915 (100) | 4901 (99) | 3381 (99) | 7123 (99) | 8053 (90) |
| 8 | 8187 (25) | 4899 (100) | 6085 (95) | 4371 (100) | 8173 (90) | 5091 (99) |
| 9 | 6328 (25) | 6963 (70) | 6736 (90) | 4936 (99) | 8995 998) | 7061 (95) |
| Average | 5938 (51) | 6898 (74) | 6705 (76) | 5249 (99) | 8481 (84) | 5586 (99) |
| St. Dev. | 1330 (30) | 1826 (28) | 1098 (32) | 978 (1) | 843 (24) | 1911 (3) |

*8364A37174 is the same as 5815-140 prepolymer.

These results demonstrate that adhesives derived from prepolymers 6204-144 and 8364A37174 exhibited better overall ultimate finger joint strength than the adhesive derived from the 6298-167 prepolymer, taking both strength and wood failure into consideration.

Example XV

In order to determine whether the two-part polyurethane-soy protein hydrolyzate adhesives exhibit good accelerated aging (wet stress) resistance, ASTM D-5751 non-structural laminate and ASTM D-2559 structural laminate wet performance tests were performed. Prepolymers described in Examples I and VII were mixed with different soy protein hydrolyzates at a weight ratio of 4:1. The results recorded are set forth below.

TABLE 16

ASTM D-5751
Douglas Fir (MC of 6.5–7.2%, Sp. Gr. Of 0.41–0.51)

| Prepolymer | 8364A37174* | 6298-145C** | 8364A37174 | 6298-145C |
|---|---|---|---|---|
| Hydrolzate | 6298-156B** | 6298-156B | 6298-156B | 6298-156B |
| CAT (min) | 13 | 12 | 7 | 6 |
| Dry (psi) | 1656 | 1327 | 1456 | 1336 |
| Dry (WF %) | 85 | 50 | 90 | 75 |
| Vac-Pressure (psi) | 881 ± 34 | 422 ± 251 | 886 ± 54 | 358 ± 317 |
| Vac Pressure (WF %) | 81 ± 16 | 9 ± 9 | 81 ± 12 | 358 ± 317 |
| 2-Boil Cycles (psi) | 712 ± 80 | 451 ± 321 | 791 ± 66 | 510 ± 254 |
| 2-Boil Cycles (WF %) | 65 ± 17 | 44 ± 20 | 80 ± 13 | 54 ± 28 |

*8364A37174 is the same as 5815-140 of Example I.
**For 6298-145C, see Example VI, Table 4.
***For 6298-156B, see Example VIII, Table 7.

TABLE 17

ASTM D-2559
Douglas Fir (MC of 6.9–8.2%, Sp. Gr. OF 0.46–0.48

| Adhesive | 6298-145C* 6298-156B*** | 6298-145C 6298-162B*** | 8364A37174** 6298-156B | 8364A37174 6298-162B |
|---|---|---|---|---|
| SPECIFIC GRAVITY OF BOARD | | | | |
| Board 1 | 0.445 | 0.445 | 0.444 | 0.444 |
| Board 2 | 0.464 | 0.460 | 0.459 | 0.457 |
| Board 3 | 0.538 | 0.533 | 0.478 | 0.472 |
| Board 4 | 0.465 | 0.465 | 0.470 | 0.472 |
| Board 5 | 0.445 | 0.448 | 0.454 | 0.454 |
| Board 6 | 0.439 | 0.441 | 0.441 | 0.441 |
| DELAMINATION % PER GLUELINE | | | | |
| GL1 | 10.81 | 5.22 | 0.56 | 0.31 |
| GL2 | 20.00 | 6.46 | 0.15 | 0.27 |
| GL3 | 5.97 | 8.02 | 0.43 | 0.35 |
| GL4 | 16.38 | 8.52 | 0.79 | 0.14 |
| GL5 | 4.66 | 7.05 | 0 | 2.41 |
| TOTAL DELAMINATION (%) | 57.82 | 35.27 | 1.93 | 3.48 |

*For 6298-145C, see Example VI, Table 4.
**8364A37174 is the same as 5815-140 of Example I.
***For 6298-156B or 162B, see Example VIII, Table 7.

The foregoing tabulated results clearly indicate that the adhesive derived from the flexible prepolymer, 8364A37174, outperformed the adhesive derived from the rigid polymer system, 6298-145C, in the wet stress performance tests using soy protein hydrolyzates 6298-156B and 6298-162B using different closed assembly times.

Example XVI

Additional testing according to ASTM D-2559 delamination specifications of the 4:1 weight ratio prepolymer:soy protein was undertaken with the following results being recorded.

TABLE 18

Douglas Fir (MC of 8–10%, Sp. Gr. Of 0.45–0.53)

| Adhesive | 5815-140* 6289-009A*** | 5815-140** 6289-009B*** | 5815-140** 6389-010B*** |
|---|---|---|---|
| Closed Assembly Time (min) | 6 | 6 | 4 |

TABLE 18-continued

Douglas Fir (MC of 8–10%, Sp. Gr. Of 0.45–0.53)

| | SPECIFIC GRAVITY OF BOARDS | | |
|---|---|---|---|
| Board 1 | 0.493 | 0.476 | 0.477 |
| Board 2 | 0.446 | 0.481 | 0.481 |

TABLE 18-continued

Douglas Fir (MC of 8–10%, Sp. Gr. Of 0.45–0.53)

| | | | |
|---|---|---|---|
| Board 3 | 0.491 | 0.550 | 0.558 |
| Board 4 | 0.447 | 0.519 | 0.519 |
| Board 5 | 0.485 | 0.486 | 0.487 |
| Board 6 | 0.447 | 0.464 | 0.462 |
| DELAMINATION % PER GLUELINE | | | |
| GL 1 | 2.36 | 0 | 0.38 |
| GL 2 | 1.60 | 0.36 | 1.03 |
| GL 3 | 1.30 | 1.30 | 4.29 |
| GL 4 | 0.55 | 1.53 | 3.59 |
| GL 6 | 3.48 | 0.48 | 1.27 |
| Total Delamination % | 9.29 | 3.67 | 10.56 |

*Same as EP 5815-106-3, see Example I.
**Same as EP 5815-106-3 except without tin catalyst from Example I.
***6289 series, see Example VI, Table 5.

TABLE 19

Soy Protein Hydrolyzate: 6298-174 (same as 6298-156B)
Douglas Fir (MC of 7–10%, Sp. Gr. Of 0.050–0.60)

| Prepolymer Used | 6204-144* | 8364A37174** | 6204-144 | 8364A37174 |
|---|---|---|---|---|
| Closed Assembly Time (min) | 10 | 9 | 5 | 4 |
| SPECIFIC GRAVITY OF BOARD | | | | |
| Board 1 | 0.507 | 0.508 | 0.514 | 0.536 |
| Board 2 | 0.522 | 0.517 | 0.511 | 0.529 |
| Board 3 | 0.552 | 0.574 | 0.582 | 0.596 |
| Board 4 | 0.536 | 0.534 | 0.530 | 0.529 |
| Board 5 | 0.522 | 0.523 | 0.525 | 0.509 |
| Board 6 | 0.507 | 0.504 | 0.501 | 0.500 |
| DELAMINATION % PER GLUELINE | | | | |
| Glueline 1 | 0 | 0 | 0.56 | 0.94 |
| Glueline 2 | 0.07 | 0 | 0.13 | 0 |
| Glueline 3 | 0 | 0.09 | 0.07 | 0.08 |
| Glueline 4 | 0 | 0 | 0 | 0 |
| Glueline 5 | 0 | 2.22 | 0 | 0 |
| Total Delamination % | 0.07 | 2.3 | 0.76 | 1.01 |

*For 6204-144, see Example VI, Table 4.
**8364A37174 is the same as 5815-140 of Example I.

These results indicate that low degrees of delamination were obtained with the novel adhesive, which in turn indicates its suitability for exterior structural engineered wood applications, particularly with the more flexible prepolymers 8364A37174 and 6204-144.

What is claimed is:

1. A laminated wood product adhesively joined with the cured residue of an adhesive which comprises:
    (a) an isocyanate-terminated prepolymer; and
    (b) aqueous hydrolyzed soy protein having a pH of at least about 9,
the weight ratio of (a) to (b) ranging from about 70:30 to 90:10.

2. The laminated wood product of claim 1, wherein said adhesive has been cured by heat or radio frequency (RF) curing.

3. The laminated wood product of claim 1, wherein said isocyanate-terminated prepolymer is made from an isocyanate component selected from hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatornethyl)cyclohexane ($H_6XDI$), dicyclohexylmethane diisocyanate ($H_{12}MDI$), dimer acid diisocyanate (DDI), trimethyl hexamethylene diisocyanate, lysine diisocyanate or its methyl ester, isophorone diisocyanate, methyl cyclohexane diisocyanate, 1,5-napthalene diisocyanate, xylylene diisocyanate or xylene diisocyanate or methyl derivatives thereof, polymethylene polyphenyl isocyanates, chlorophenylene-2,4-diisocyanate, polyphenylene diisocyanates, isophorone diisocyanate (IPDI), hydrogenated methylene diphenyl isocyanate (HMDI), tetramethyl xylene diisocyanate (TMXDI), hexamethylene diisocyanate (HDI), or oligomers thereof, or mixtures thereof.

4. The laminated wood product of claim 1, wherein said isocyanate-terminated prepolymer is made from a component containing an active hydrogen group.

5. The laminated wood product of claim 4, wherein said active hydrogen group component is selected from an acrylate group, an ester group, a vinyl group, a castor oil, or polymers or mixtures thereof containing active hydrogen groups.

6. The laminated wood product of claim 5, wherein said active hydrogen group component is selected from aliphatic or aromatic polyether polyols optionally alkylated, or caprolactone-based polyols.

7. The laminated wood product of claim 1, wherein said isocyanate pre-polymer has an NCO content of between about 17 and 22.

8. The laminated wood product of claim 1, wherein said aqueous hydrolyzed soy protein has a pH ranging from between about 9 and 11.5.

* * * * *